(12) United States Patent
Ferry

(10) Patent No.: US 9,521,120 B2
(45) Date of Patent: Dec. 13, 2016

(54) METHOD FOR SECURELY TRANSMITTING CONTROL DATA FROM A SECURE NETWORK

(75) Inventor: Allan G. Ferry, Windsor, CT (US)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 792 days.

(21) Appl. No.: 12/765,403

(22) Filed: Apr. 22, 2010

(65) Prior Publication Data

US 2010/0275031 A1 Oct. 28, 2010

Related U.S. Application Data

(60) Provisional application No. 61/171,879, filed on Apr. 23, 2009.

(51) Int. Cl.
*H04L 29/06* (2006.01)

(52) U.S. Cl.
CPC ......... *H04L 63/029* (2013.01); *H04L 63/1458* (2013.01)

(58) Field of Classification Search
CPC ........................... H04L 63/029; H04L 63/1458
USPC ................. 713/153, 168, 171, 181; 726/3, 5
See application file for complete search history.

(56) References Cited

U.S. PATENT DOCUMENTS 5,271,061 A * 12/1993 Crandall ................. G06F 7/725
380/28
5,553,095 A * 9/1996 Engdahl et al. ............ 375/222
6,108,787 A * 8/2000 Anderson et al. ................ 726/5
6,321,333 B1 * 11/2001 Murray ................. H04L 9/3265
713/156

(Continued)

OTHER PUBLICATIONS

Standard CIP-006-1—Cyber Security—Physical Security. Jun. 1, 2006. p. 1-5.*

(Continued)

*Primary Examiner* — Kari Schmidt
(74) *Attorney, Agent, or Firm* — GE Global Patent Operation; Stephen G. Midgley

(57) ABSTRACT

This method securely transmits data from a secure control system [110] located on an isolated computer network [100] to a separate computer [210] outside the isolated control network [100]. The method includes several features designed to minimize the risk of outside cyber attack on the control system [110] while ensuring that the data is transmitted correctly and promptly. The system uses a non-routable unidirectional physical data link [300]. Messages [400] are redundantly transmitted to computer [210] without acknowledgement along with checksums [430,450]. The checksum information is used to validate that the message header [420] and the message data [440] have been received correctly. Redundant information contained in repeated message data blocks [440] is discarded after the transmitted message [400] is correctly received and decoded. An ordered transmission sequence is used to minimize the message delay if an individual message [400] was not received correctly on its first transmission.

14 Claims, 4 Drawing Sheets

(56) References Cited

U.S. PATENT DOCUMENTS

| | | | |
|---|---|---|---|
| 6,614,804 B1* | 9/2003 | McFadden et al. | 370/468 |
| 7,093,134 B1* | 8/2006 | Gong | G06F 21/6209 380/282 |
| 7,260,833 B1* | 8/2007 | Schaeffer | 726/3 |
| 7,675,867 B1* | 3/2010 | Mraz et al. | 370/254 |
| 2002/0095568 A1* | 7/2002 | Norris | H04L 63/0435 713/151 |
| 2002/0199096 A1* | 12/2002 | Wenocur | G06Q 10/107 713/153 |
| 2003/0079045 A1* | 4/2003 | Bender | H04L 29/06 709/251 |
| 2004/0172207 A1* | 9/2004 | Hancock et al. | 702/60 |
| 2004/0240453 A1* | 12/2004 | Ikeda et al. | 370/395.21 |
| 2005/0033990 A1* | 2/2005 | Harvey et al. | 713/201 |
| 2008/0008207 A1* | 1/2008 | Kellum | 370/433 |
| 2008/0051034 A1* | 2/2008 | Hashimoto | 455/66.1 |
| 2008/0259929 A1* | 10/2008 | Mraz | 370/395.1 |
| 2010/0257353 A1* | 10/2010 | Cheng | 713/153 |
| 2011/0153969 A1* | 6/2011 | Petrick | 711/163 |
| 2014/0136915 A1* | 5/2014 | Hyde | G06F 11/0703 714/747 |

OTHER PUBLICATIONS

Andreas Willig, Redundancy Concepts to Increase Transmission Reliability in Wireless Industrial LANs. Aug. 2005. IEEE. p. 173-82.*

Interpretation of CIP-006-1—Physical Security of Critical Cyber Assets. North American Electric Reliability Corp. Aug. 9, 2007. p. 1.*

Compliance Application Notice—0024. No date. North American Electric Reliability Corp. (no date). p. 1-3.*

Papadimitratos, Panos, et al. "Secure neighborhood discovery: a fundamental element for mobile ad hoc networking." IEEE Communications Magazine 46.2 (2008): 132-139.*

Deng, Jing, Richard Han, and Shivakant Mishra. "Secure code distribution in dynamically programmable wireless sensor networks." Proceedings of the 5th international conference on Information processing in sensor networks. ACM, 2006. (pp. 292-300).*

North American Electric Reliability Council, "*Frequently Asked Questions (FAQs) Cyber Security Standards CIP-002-1 through CIP-009-1*", Jan. 11, 2006, Available at http://www.nerc.com/pa/Stand/Cyber%20Security%20Permanent/CIP-002-009_FAQs_11Jan06.pdf.

* cited by examiner

METHOD FOR SECURELY TRANSMITTING CONTROL DATA FROM A SECURE NETWORK

CROSS REFERENCE TO RELATED APPLICATIONS

This application claims priority from U.S. Provisional Patent Application Ser. No. 61/171,879 filed Apr. 23, 2009 entitled "Method for Securely Transmitting Control Data From a Secure Network" and incorporates all of the material that does not conflict with the present application.

FIELD OF THE INVENTION

The present invention is directed to a system for secure one-way transmission of data. More particularly, the present invention is directed to a system for secure one-way transmission of data from a secure network to a general-purpose network.

BACKGROUND

Digital computer-based protected control networks are widely used at power and process industry plants around the world. Most of the newer protected control networks are capable of communicating over standard networks such as TCP/IP over Ethernet. A variety of standard and custom protocols are used over standard computer networks to communicate data to, and from, the protected control networks. Examples of standard protocols include OLE for Process Control (OPC) and Modbus/TCP. This makes it easier to communicate data between systems, but allows a potential channel for cyber-attacks on the protected control networks.

Traditionally the danger of cyber-attack has been mitigated by placing all of the protected control networks on one or more isolated control networks. This protects the protected control networks from many external attacks, but does not allow communication with the outside world. Communication from the control or monitoring systems to the outside world has sometimes been implemented through a network firewall. Firewalls selectively allow limited communication between the protected control networks (on the control network) and specific computers on a general business network.

Proper design and implementation of the network and firewall design reduces, but does not eliminate, the possibility of cyber-attack. If a computer outside the control network has been granted limited firewall access to communicate to a control or monitoring system on the control network, this outside computer may be used as the base for a cyber-attack on the control or monitoring system computer. While these attacks are more difficult to perform because of the firewall, they are not impossible.

Increasing emphasis is being placed on cyber security to protect against casual computer hackers as well as organized crime and agents employed by governments or intelligence agencies. Publicized and private security breaches occur on a regular basis. Best practices for cyber security are becoming increasingly stringent as cyber-attacks become more sophisticated. Requirements such as the Federal Energy Regulatory Commission's Critical Infrastructure Protection standards may prohibit the use of a routable network protocol to communicate between protected control networks. This eliminates the traditional use of standard computer communication networks and firewalls for communication between control or monitoring systems and computers attached to a general-purpose network.

Control and monitoring system data is still needed for general business purposes such as production planning and equipment health monitoring. This requires a different approach to data communication that accurately and safely transmits data from protected control networks to general-purpose computer systems without the risk of cyber-attack on the control systems.

Several industrial communication systems can be used to communicate data from a control system. These provide options to a traditional computer network that do not use a routable protocol. Examples include Modbus communication over a serial connection and control or fieldbus networks such as CAN (Controller Area Network) or Profibus. These industrial communication systems are all bi-directional. Data can be transmitted from the control systems to the general-purpose computers, and from the general-purpose computers to the control system. While the fact that some of these protocols are not routable reduces the risk of cyber-attack, it does not eliminate it. This is especially true if data is transmitted to the control system from the general-purpose computer.

For example, a power plant control system may receive a load demand signal (production output request) from the general-purpose computer. If an attacker can control the general-purpose computer, they may send a load demand signal of zero to the control system, effectively shutting down the power plant. Even if no data is transmitted from the general-purpose computer to the control system there is still a smaller risk of attack. Most industrial communication links require feedback from the receiving system for coordinating communication, reporting errors, and acknowledging that data has been received correctly. Improper or illegal messages sent over the communication link from the general-purpose computer may interfere with the proper operation of the control system in some cases. This is true even when the actual data is being transmitted in only one direction. These "Denial Of Service" attacks require more skill to conduct but are still possible for a dedicated attacker.

Currently, there is a need for a secure means of transmitting information from a secure network without the risk of unwanted entities gaining control of the secure network.

SUMMARY OF THE INVENTION

The present invention may be embodied as a secure system for transmitting message data [440] from a secure computer on a secure network to a non-secure computer on a non-secure network having a one-way communication link from the secure computer to the non-secure computer.

It also employs a predetermined protocol known by both the secure computer [110] and the non-secure computer [210].

The secure computer is adapted to transmit a message [400] including said message data [440] and error detection information multiple redundant times to the non-secure computer [210] according to the predetermined protocol.

The non-secure computer is adapted to identify, decode and verify message data [440] that has been correctly transmitted according to the predetermined protocol. The transmissions may be sent a predetermined number of times, at predetermined times or sent repeatedly within predetermined time periods.

The present invention may also be embodied as a secure method of transmitting message data [440] identified by a unique message ID from a secure control system [110] to a non-secure computer [210]. This is done by:

a) assembling the message data [440] into a message [400];
b) transmitting the message [400], over a non-routable, unidirectional physical communications link from said secure control system [110] to said non-secure computer [210];
c) at the non-secure computer receiving and decoding the message [400];
d) if the message [400] had been previously received and decoded correctly, discarding currently decoded message [400] and continuing at step "b";
e) identifying if the decoded message [400] is received correctly,
f1) if the message [400] is not received correctly, then discarding the currently received message [400] and continuing processing at step "b",
f2) if the message [400] was received correctly, then decoding it to identify the message data [440],
g) validating if the message data [440] is received correctly,
h1) if the message data [440] is not received correctly, then discarding the currently received message [400] and continuing processing at step "b",
h2) if the message data [440] is received correctly, then storing this along with its unique message ID as a decoded copy,
i) repeating steps "b"-"h1/h2" for each message for a plurality of cycles.

The present invention may also be embodied as a secure method of transmitting message data [440] identified by a unique message ID from a secure control system [110] to a non-secure computer [210]. This is done by:

a) creating a message header [420] having information identifying the message and indicating its structure;
b) creating a message checksum [450] from the message header [420], and message data [440];
c) transmitting a message [400] comprising the message header [420], message data [440] and message checksum [450] over a unidirectional physical communications link from said secure control system [110] to said non-secure computer [210];
d) at the non-secure computer receiving the message [400];
e) using the message checksum [450] to identify if the message [400] was received correctly,
f1) if the message [400] was not received correctly, then discarding the currently received message [400] and continuing processing at step "c",
f2) if the message [400] was received correctly, then using the message header [420] it to identify the message data [440],
g) validating that the message data [440] was received correctly,
h1) if the message data [440] was not received correctly, then discarding the currently received message [400] and continuing processing at step "c",
h2) if the message data [440] was received correctly, then identifying the message ID and storing this as a decoded copy of the given message ID,
i) if all of the message data [440] for this message ID has not been successfully received in earlier transmissions, saving the decoded copy for further communication or processing, and
j) repeating steps "c"-"i" for each message a predetermined number of times.

OBJECTS OF THE INVENTION

It is an object of the present invention to provide a system exhibiting minimized risk of cyber-attack or interference with the control system operation compared to traditional computer network connections or industrial communication links.

It is another object of the present invention to provide a unidirectional physical transmission media that does not provide cyber-attackers with an entry point to the control or monitoring systems.

It is another object of the present invention to provide a reliable transmission of data without communication feedback.

It is another object of the present invention to transmit accurate data despite the lack of communication error feedback.

It is another object of the present invention to provide a communications method that is compliant with the FERC CIP cyber security rules for power generation and distribution equipment.

It is another object of the present invention to provide a communications method using a non-routable communication protocol.

BRIEF DESCRIPTION OF THE DRAWINGS

The present invention may be better understood and its numerous objects and advantages will become apparent to those skilled in the art by reference to the accompanying drawings in which.

DETAILED DESCRIPTION OF THE PREFERRED EMBODIMENTS

The communication system and method of the present invention provides benefits over traditional computer networks and industrial communication systems. It provides increased security when it is employed to connect a secure computer on an isolated plant protected control network to a non-secure computer on a general-purpose computer network.

Figure 1:
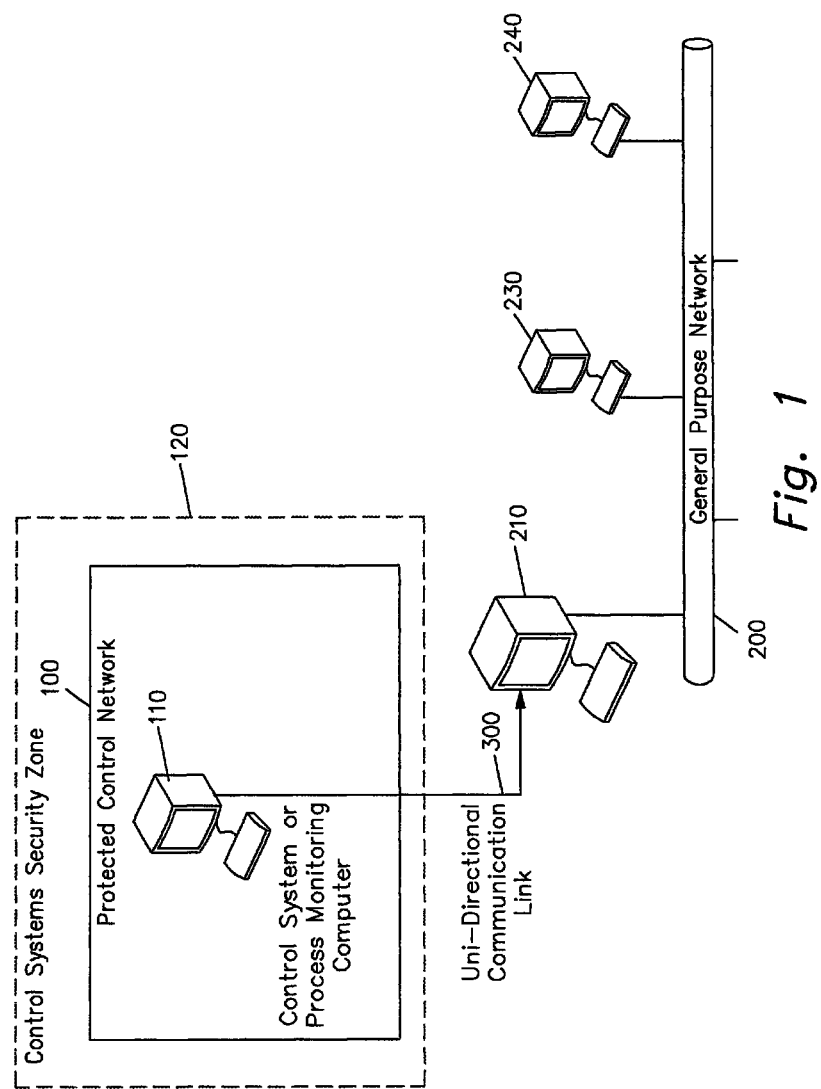
FIG. 1 is a schematic block diagram for showing the physical connection topology according to one embodiment of the present invention.

FIG. 1 is a schematic block diagram for showing the physical connection topology according to one embodiment of the present invention.

A unidirectional communication channel 300 is used by the present invention to send data from a secure computer 110 which may be part of a larger secure data network, such as a protected control network 100, to a non-secure, general-purpose computer 210 on a non-secure computer network 200 outside of control systems security zone 120. The physical communication channel 300 is a point-to-point link that is only capable of operating in one direction, sending data from the secure computer 110 on a secure protected control network 100 to a non-secure computer 210 on the non-secure computer network 200 outside the security zone 120. This data link 300 may be implemented in multiple physical methods, including but not limited to serial communications such as RS-232 or RS-422, fiber optic links, and optical or radio transmission.

Removing any possibility of data transmission from the non-secure computer 210 to the secure protected control network 100 significantly reduces the possibility of cyber-attack compared to a traditional computer network with firewall protection or a bi-directional industrial communication link. However the loss of feedback eliminates the normal methods of coordinating data transmission, reporting errors, detecting and acknowledging that data has been received correctly. This method includes additional steps needed to replace as many of the traditional feedback functions as possible without the use of bi-directional communication.

Figure 2:
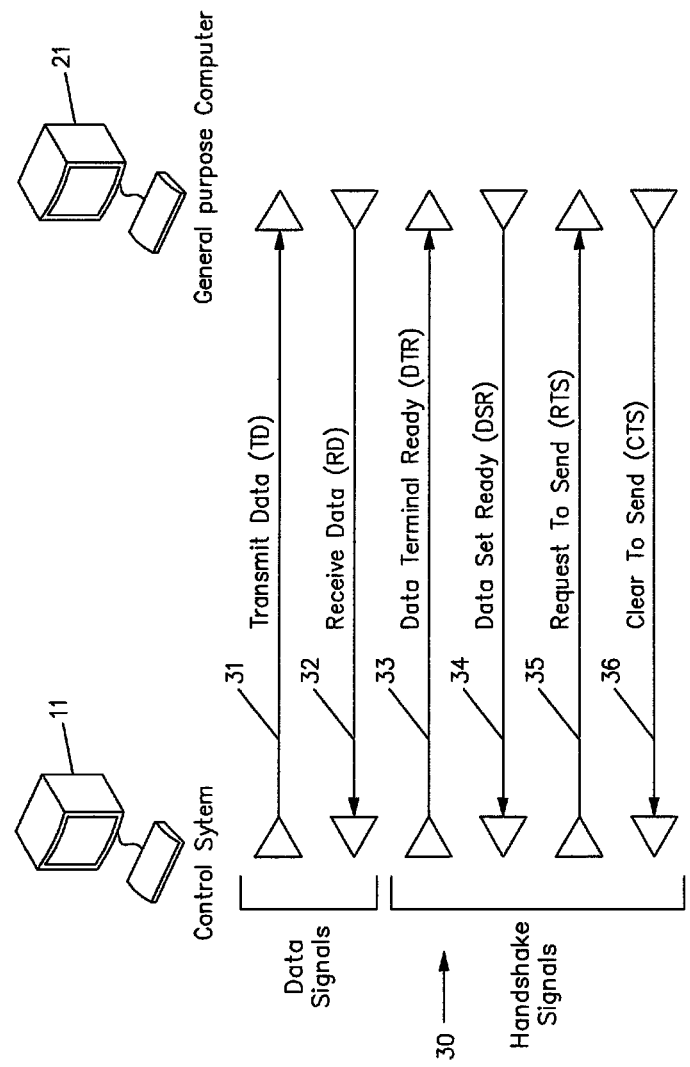
FIG. 2 is a schematic block diagram showing physical connections of a prior art serial interface.

FIG. 2 is a schematic block diagram showing physical connections of a prior art serial interface.

This is a traditional RS-232 serial connection between a control system 11 and a general-purpose computer 21. Note that the Transmit Data (TD) wire 31 is used to send data from the control system 11 to the general-purpose computer 21 while the Receive Data (RD) wire 32 is used to send data from the general-purpose computer 21 to the control system 11. The remaining 4 wires (33, 34, 35, 36) are optional, and used to signal when each of the 2 computers is ready to receive data. These 4 handshake signals are not capable of transmitting actual data.

Figure 3:
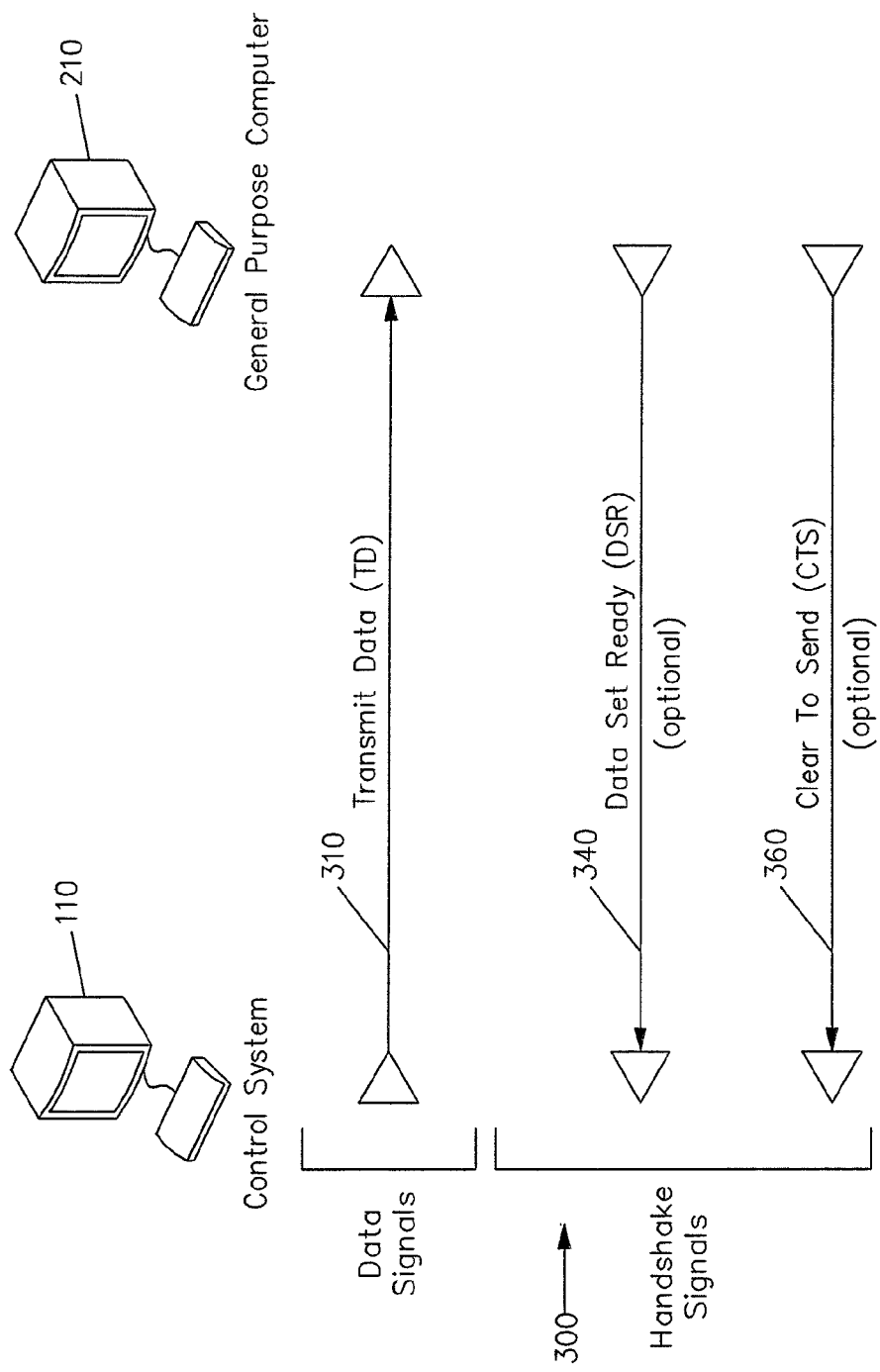
FIG. 3 is a schematic block diagram showing physical connections of one embodiment of the present invention.

FIG. 3 is a schematic block diagram showing physical connections of one embodiment of the present invention.

This is a modified RS-232 serial connection 300 according to one embodiment of the present invention. The Receive Data wire (32 of FIG. 2) that transmitted data from the general-purpose computer (21 of FIG. 2) to the control system (11 of FIG. 2) is no longer present. This physically enforces the unidirectional nature of the communication link 300. In addition two of the handshake signals (33, 35 of FIG. 2) are no longer needed and have been removed.

In alternative embodiments of the present invention, a Data Set Ready (DSR) 340 and/or a Clear to Send (CTS) handshaking communication control signals are optional and may be employed. These provide "handshaking" information to aid in the transmissions. Both of these lines are strictly for protocol and control information and are incapable of transmitting data.

A similar unidirectional physical connection can be made with fiber optics by removing one of the two fiber optic cables in a connection. Fiber optic cables are normally used in pairs, with one fiber transmitting in each direction, similar to the RD (32 of FIG. 2) and TD wires (31 of FIG. 2) in an RS-232 serial connection. Removing the fiber that transmits from the general-purpose computer 210 to the control system 110 serves the same purpose as removing the RD wire (32 of FIG. 2) in the RS-232 connection. Similar unidirectional communication can be established with radio, optical, and many other physical communication links.

The U.S. Federal Energy Regulatory Commission's Critical Infrastructure Protection standards require a high level of protection against cyber-attack for equipment used in electrical generation and distribution, but this method is also applicable to process control and monitoring system data in other industries.

Figure 4:
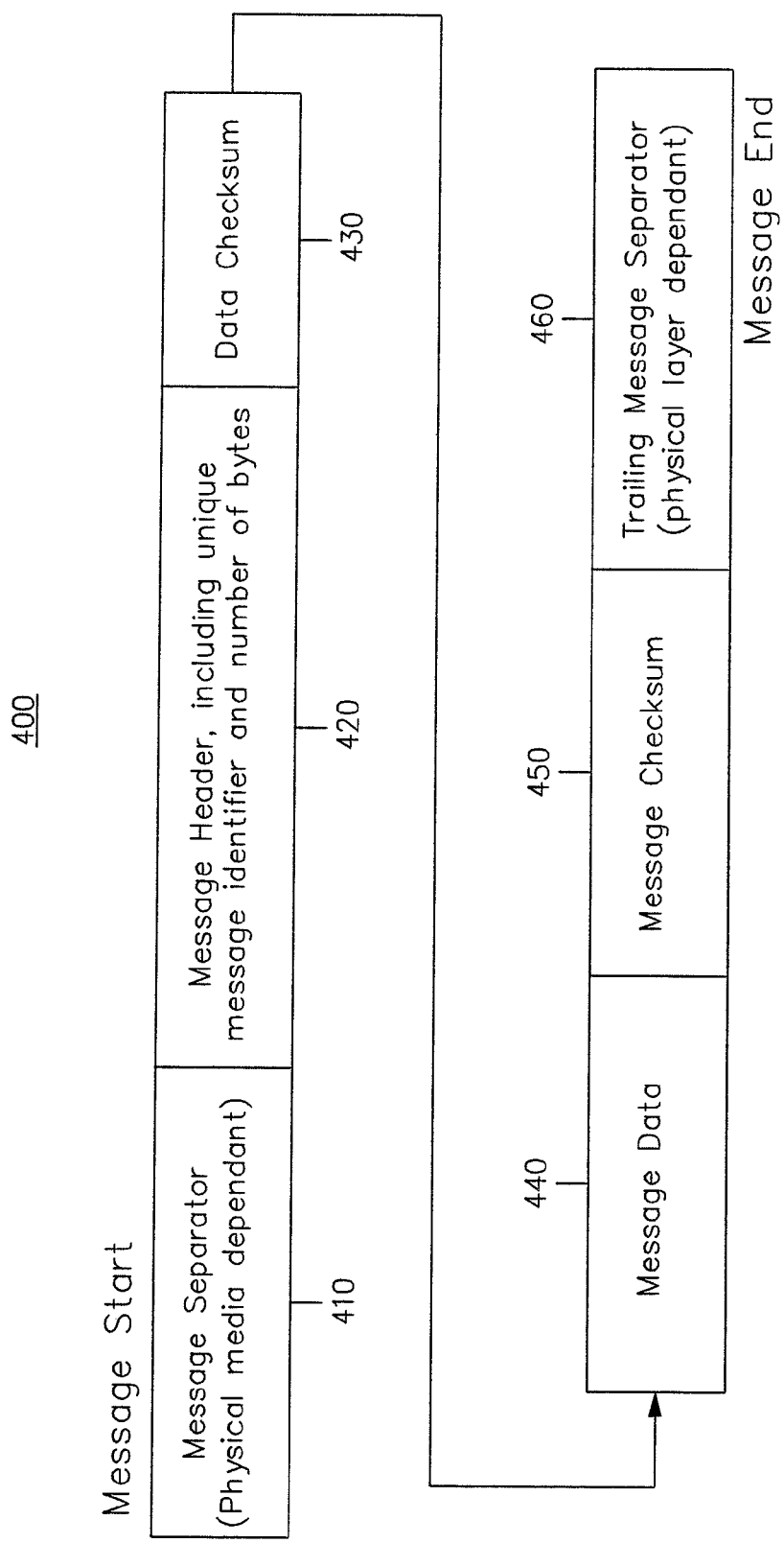
FIG. 4 is a data structure for a data organization according to one embodiment of the present invention.

Several features are used to coordinate the one-way communication and to validate that data has been correctly received. Refer to FIG. 4 for a representative illustration of the message format described by these features.

FIG. 4 shows a message format for data communication according to one embodiment of the present invention.

Data is divided into discrete messages 400. These messages 400 do not need to be of fixed length or format. However the interpretation of the data and format must be coordinated between the sending and receiving systems.

Discrete data messages 400 have a message header 420, a data checksum 430, message data 440, and message checksum 450. Message header 420 contains information about the data transmitted (control data and metadata). Necessary information includes the length of the data message and a unique message identifier. The unique message identifier may include information about the data source, time range for time series process data, or other information. The data checksum 430 is added to the message 400 so that the receiving system can verify that each message data block 440 has been received correctly. The message checksum 450 is used so that the receiving system can verify that the message header 420, data checksum 430, and message data 440 have been received correctly.

Each message 400 is transmitted multiple times. Multiple transmissions, along with the unique message identifier, allow the receiving computer to confirm when each message has been correctly received.

The number of message transmissions required may be pre-calculated based on the expected bit error rate of the physical connection, number of bits in the maximum size message used, and the required transmission reliability.

All messages 400 pending delivery on the sending computer are sent in ordered groups. The newest pending message 400 is sent first in each group, followed by increasingly older messages 400. This ensures that new data messages arrive in a timely fashion. If a new message 400 is not correctly received (calculated from the checksum and message identifier), it will be transmitted second in the next message group. This sequence minimizes the delay time for message retransmission assuming a normally reliable unidirectional data link. It also does not require error feedback from the receiving computer to the sending computer.

Messages 400 within each group are separated by a transmission break (period of silence) or by a transmission sequence that does not match any valid data shown in FIG. 4 as message separators 410 and 460. Examples of a message sequence that does not match any valid data include a "break" sequence for RS-232 and framing sequences used by some telecommunications protocols.

Message groups may be separated by a longer transmission break or by a different transmission sequence that does not match any valid data if desired.

Message transmission may include additional error detection and recovery data depending on the physical transmission method chosen. Error detection and recovery data may includes character parity bits, Error Correction Code (ECC) bits, and Cyclical Redundancy Checks (CRCs) for sub-blocks of data in a message.

Message data may be compressed to minimize the transmission bandwidth required.

Message data may be encrypted to further protect the data from theft if required. Encryption will be particularly valuable if radio or optical transmission methods are used.

Communication link bandwidth used by message retransmission replaces the need for error reporting from the receiving computer to the sending computer.

Messages may be delivered a variable (configurable) number of times depending on the amount of data to be transmitted, the physical datalink reliability, and the opportunity cost of lost messages.

In normal operations with a relatively reliable physical data link the receiving computer will frequently receive each data message correctly multiple times. Based on the unique message identifier the receiving computer will discard repeated messages that have already been correctly received.

Message group transmissions may be time scheduled (e.g. transmit all pending messages every 30 seconds) or the next message group transmission may begin shortly after the last group transmission ends.

Data from multiple protected control networks may be combined over a single data link from the control network to a general-purpose computer network. Minimizing the number of physical connections from the control network makes it easier to maintain physical and cyber security of the control systems.

Data may be redistributed by the non-secure computer 210 to multiple systems on the general-purpose network 200.

The present invention may be used to transmit data from multiple protected control systems located on an isolated control network to another computer on the general-purpose network over a single secure communication link.

The present invention is also applicable to a wide variety of process data. Examples include traditional control systems (Programmable Logic Controllers and Distributed Control Systems), Advanced control and optimization systems, environmental monitoring systems, and equipment health monitoring systems.

Conformance with future security rules which may prohibit bi-directional communication links between control systems and computers on a general-purpose network. Most current industrial applications do not have this requirement yet. If future security rules prohibit bi-directional communication, the users of this method will not be required to remove their existing data communication links.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention.

What is claimed is:

1. A secure system for transmitting message data from a secure computer on a secure network to anon-secure computer on a non-secure network comprising:
   a one-way communication link from the secure computer directly to the non-secure computer, wherein the one-way communication link is configured to provide the only communication between the secure computer and non-secure computer;
   a predetermined non-routable communication protocol known by both the secure computer and the non-secure computer; and
   wherein said secure computer is configured to transmit a message including said message data and error detection information multiple redundant times to the non-secure computer according to the predetermined protocol,
   said non-secure computer is configured to identify, decode, and verify message data that has been correctly transmitted according to the predetermined protocol, and further configured to discard message data that has not been correctly transmitted according to the predetermined protocol, and to store message data that has been transmitted correctly according to the predetermined protocol,
   the secure computer receives no feedback data from the non-secure computer,
   each cycle of transmission begins with a newest pending message being transmitted first and followed by an older pending message, which has not yet been transmitted a pre-determined number of times, and
   the predetermined non-routable communication protocol does not include a data field that facilitates routing of the message over a packet routing network.

2. The secure system of claim 1 wherein:
   the message includes a message checksum; and
   the non-secure computer is further configured to use the message checksum to determine whether the message was correctly received.

3. The secure system of claim 1 wherein the predetermined protocol comprises:
   transmitting the message a predetermined number of times.

4. The secure system of claim 1 wherein the predetermined protocol comprises:
   transmitting the message at scheduled times.

5. The secure system of claim 1 wherein the predetermined protocol comprises:
   transmitting the message multiple times within predetermined time periods.

6. The secure system of claim 1 wherein the one-way communications link is non-routable.

7. A secure method of transmitting message data identified by a unique message identifier from a secure control system to a non-secure computer comprising the steps of:
   a) assembling the message data into a message;
   b) transmitting the message, via a predetermined non-routable communication protocol over a unidirectional physical communications link from said secure control system directly to said non-secure computer, the unidirectional communications link providing the only communication between the secure control system and non-secure computer;
   c) at the non-secure computer receiving and decoding the message;
   d) when the message had been previously received and decoded correctly, discarding currently decoded message and continuing at step "b";
   e) identifying whether the decoded message is received correctly;
   f1) when the message is not received correctly, then discarding the currently received message and continuing processing at step "b";
   f2) when the message was received correctly, then decoding it to identify the message data;
   g) validating whether the message data is received correctly;
   h1) when the message data is not received correctly, then discarding the currently received message and continuing processing at step "b";
   h2) when the message data is received correctly, then storing the message data along with its unique message identifier as a decoded copy;
   i) repeating steps "b"-"h1/h2" for each message for a plurality of cycles; and
   wherein the secure control system receives no feedback data from the non-secure computer,
   each cycle of transmissions begins with a newest pending message being transmitted first and ending with an oldest pending message which has not yet been transmitted a pre-determined number of times, and the predetermined non-routable communication protocol does not include a data field that facilitates routing of the message over a packet routing network.

8. The secure method of transmitting message data of claim 7 wherein the number of cycles is a predetermined number.

9. The secure method of transmitting message data of claim 7 wherein the step of transmitting the message occurs at predetermined times.

10. The secure method of transmitting message data of claim 7 wherein the step of transmitting the message occurs during predetermined time periods.

11. The secure method of transmitting message data of claim 10 wherein the message further comprises:
a data checksum used to indicate if the message data was received correctly.

12. The secure method of transmitting message data of claim 7 wherein the message comprises:
a message header having the unique message identifier, and information indicating a message structure.

13. The secure method of transmitting message data of claim 12 wherein the message further comprises:
message checksum used to indicate if the message header was received correctly.

14. A secure method of transmitting message data identified by a unique message identifier from a secure computer directly to a non-secure computer comprising the steps of:
a) creating a message header having information identifying the message and indicating its structure;
b) creating a message checksum from the message header, and message data;
c) transmitting a message comprising the message header, the message data and the message checksum, via a predetermined non-routable communication protocol over a unidirectional physical communications link from said secure computer directly to said non-secure computer, the unidirectional physical communications link providing the only communication between the secure control system and non-secure computer;
d) at the non-secure computer receiving the message;
e) using the message checksum to identify whether the message was received correctly;
f1) when the message was not received correctly, then discarding the currently received message and continuing processing at step "c";
f2) when the message was received correctly, then using the message header to identify the message data;
g) validating that the message data was received correctly;
h1) when the message data was not received correctly, then discarding the currently received message and continuing processing at step "c";
h2) when the message data was received correctly, then identifying the message identifier and storing this as a decoded copy of the given message identifier;
i) when all of the message data for this message identifier has not been successfully received in earlier transmissions, saving the decoded copy for further communication or processing;
j) repeating steps "c"-"i" for each message a predetermined number of times; and
wherein the secure computer receives no feedback from the non-secure computer,
each cycle of transmissions begins with a newest pending message being transmitted first and followed by an older pending message, which has not yet been transmitted a pre-determined number of times, and
the predetermined non-routable communication protocol does not include a data field that facilitates routing of the message over a packet routing network.

* * * * *

UNITED STATES PATENT AND TRADEMARK OFFICE
CERTIFICATE OF CORRECTION

| | | |
|---|---|---|
| PATENT NO. | : 9,521,120 B2 | Page 1 of 1 |
| APPLICATION NO. | : 12/765403 | |
| DATED | : December 13, 2016 | |
| INVENTOR(S) | : Ferry | |

It is certified that error appears in the above-identified patent and that said Letters Patent is hereby corrected as shown below:

In Column 7, Line 48, in Claim 1, delete "anon-secure" and insert -- a non-secure --, therefor.

Signed and Sealed this
Eleventh Day of April, 2017

Michelle K. Lee
*Director of the United States Patent and Trademark Office*